Feb. 11, 1947.  H. G. HENDRICKSON ET AL  2,415,590
FIXTURE FOR LATHE TURNING OF ANGULARLY DISPOSED SURFACES
Filed July 26, 1943  4 Sheets-Sheet 1

INVENTORS.
HAROLD G. HENDRICKSON.
and
BY VERNER J. HAGBERG.

Castberg & Roemer

Feb. 11, 1947. H. G. HENDRICKSON ET AL 2,415,590
FIXTURE FOR LATHE TURNING OF ANGULARLY DISPOSED SURFACES
Filed July 26, 1943 4 Sheets-Sheet 2

INVENTORS.
HAROLD G. HENDRICKSON.
and BY VERNER J. HAGBERG.
Castberg & Roemer

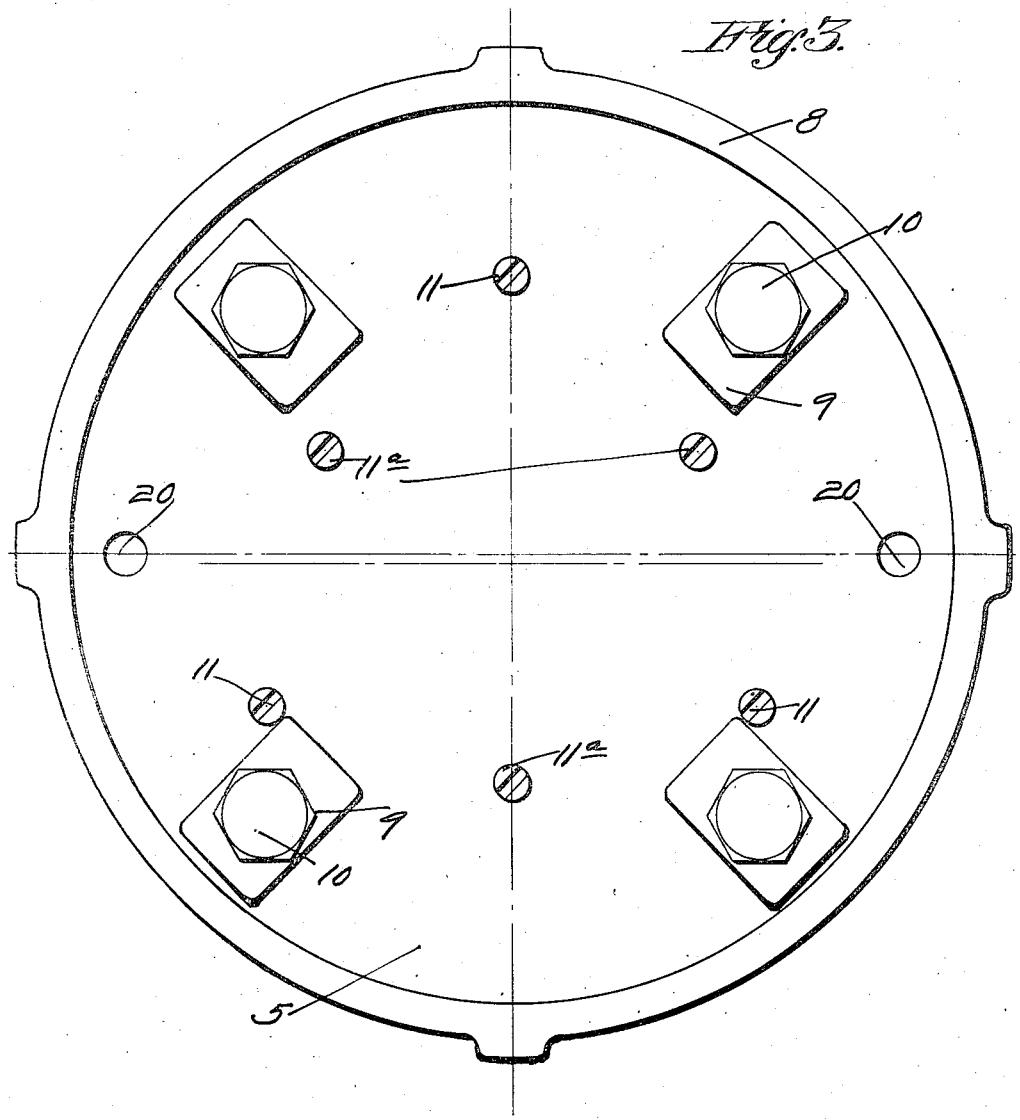

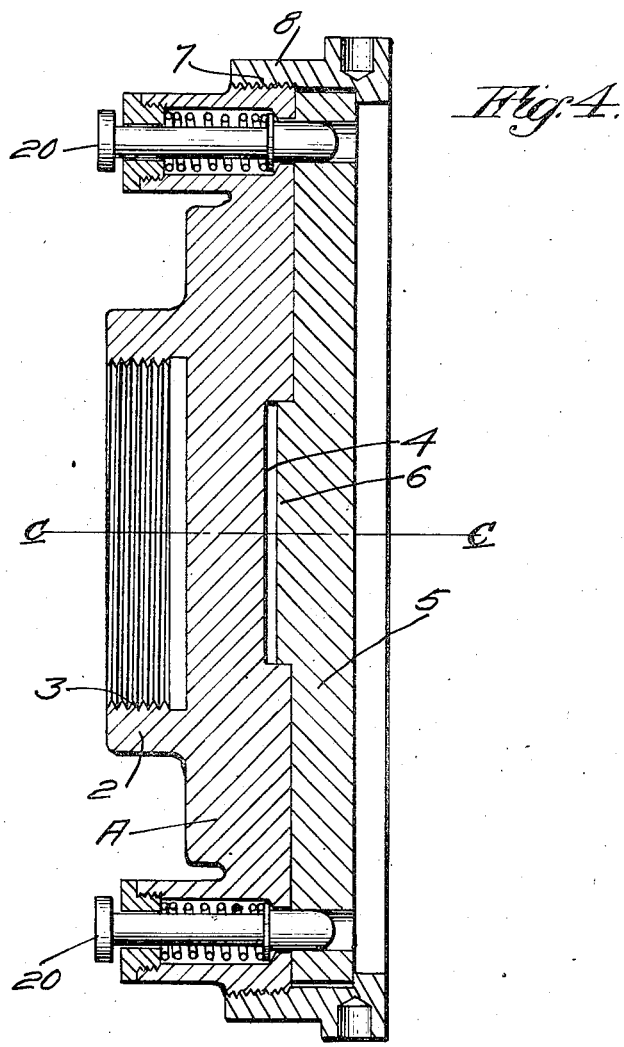

Patented Feb. 11, 1947

2,415,590

UNITED STATES PATENT OFFICE 2,415,590

FIXTURE FOR LATHE TURNING OF ANGULARLY DISPOSED SURFACES

Harold G. Hendrickson, Daly City, and Verner J. Hagberg, San Francisco, Calif., assignors to M. Greenberg's Sons, San Francisco, Calif., a partnership Application July 26, 1943, Serial No. 496,224

2 Claims. (Cl. 82—40)

This invention relates to a fixture whereby the angularly opposed seats of a gate valve may be rapidly and accurately turned off and finished in an ordinary machine lathe.

A standard gate valve comprises a valve housing having an inlet and an outlet formed therein, between which are disposed two inter-spaced angularly opposed seats, which cooperate with a wedge or valve proper to form a closure between the inlet and the outlet.

The machining of a valve of this character is a difficult and time-consuming job. It requires a skilled machinist or lathe-hand, and even so, the work performed is costly, as considerable time is required to set up the work in the chuck of a lathe when one valve seat is to be turned and finished. The same or more time is again required to set up the work when the second valve seat is to be turned and finished. In other words, it takes two setting up operations to machine the two seats formed within the valve housing, and each setting up operation must be carefully performed if accurate results are to be obtained. But even with the greatest care, it is usually necessary to apply bluing to the opposite valve faces, and then resort to hand scraping to remove high spots, etc., before proper seating of the valve with relation to the respective seats results.

The object of the present invention is to provide a fixture whereby the angularly opposed seats of a gate valve may be rapidly and accurately turned off and machined in an ordinary machine lathe; to provide a fixture in which the setting up operation of the valve housing is reduced to a minimum of time and accuracy at the same time assured; and further, to provide a fixture which requires only one setting up operation of the valve housing when machining the opposed angular valve seats formed within the valve housing.

The fixture is shown by way of illustration in the accompanying drawings, in which Fig. 1 is a central vertical longitudinal section of the fixture, showing a valve housing applied thereto and in position to be machined;

Fig. 3 is a front view of the fixture;

Fig. 4 is a cross section of the fixture taken at right angles to Fig. 1.

Figure 1:
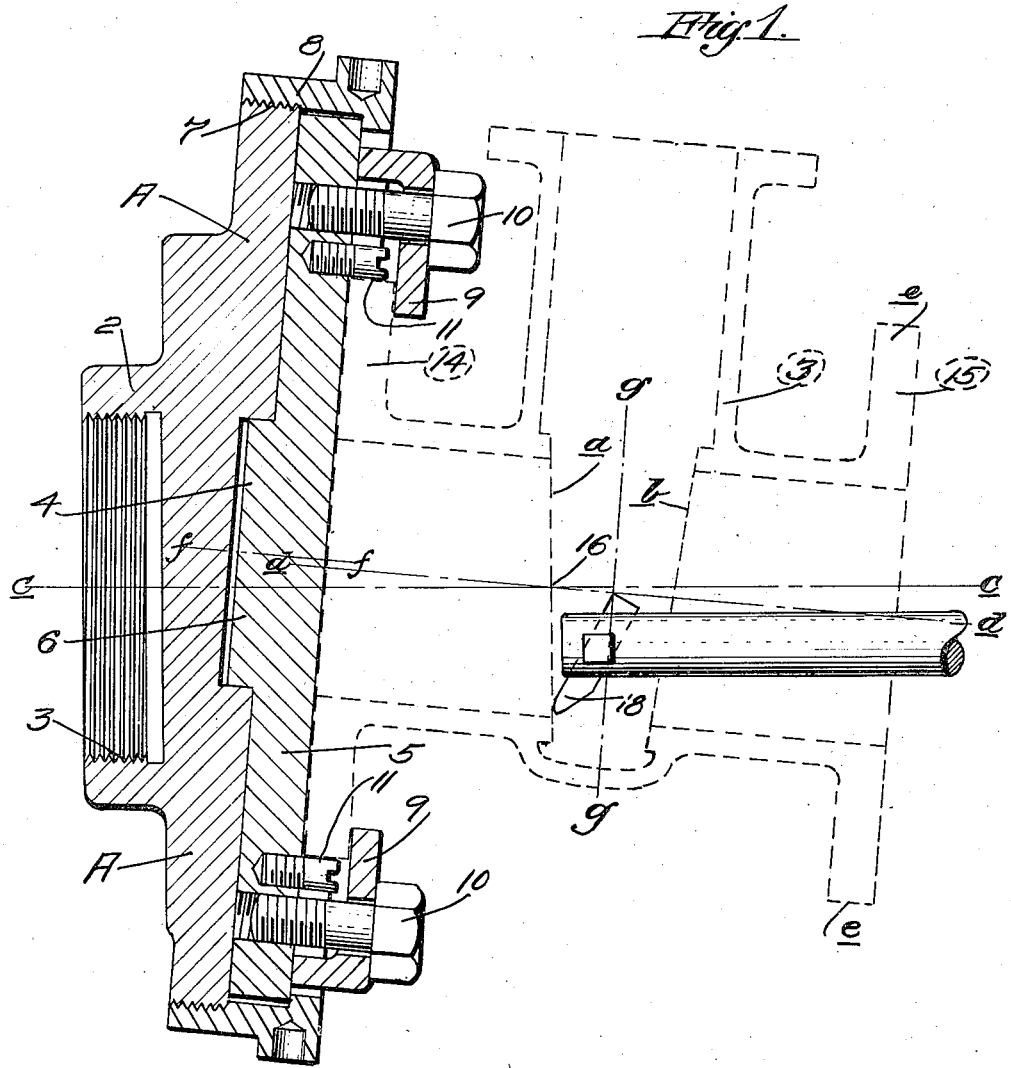
Figure 2:
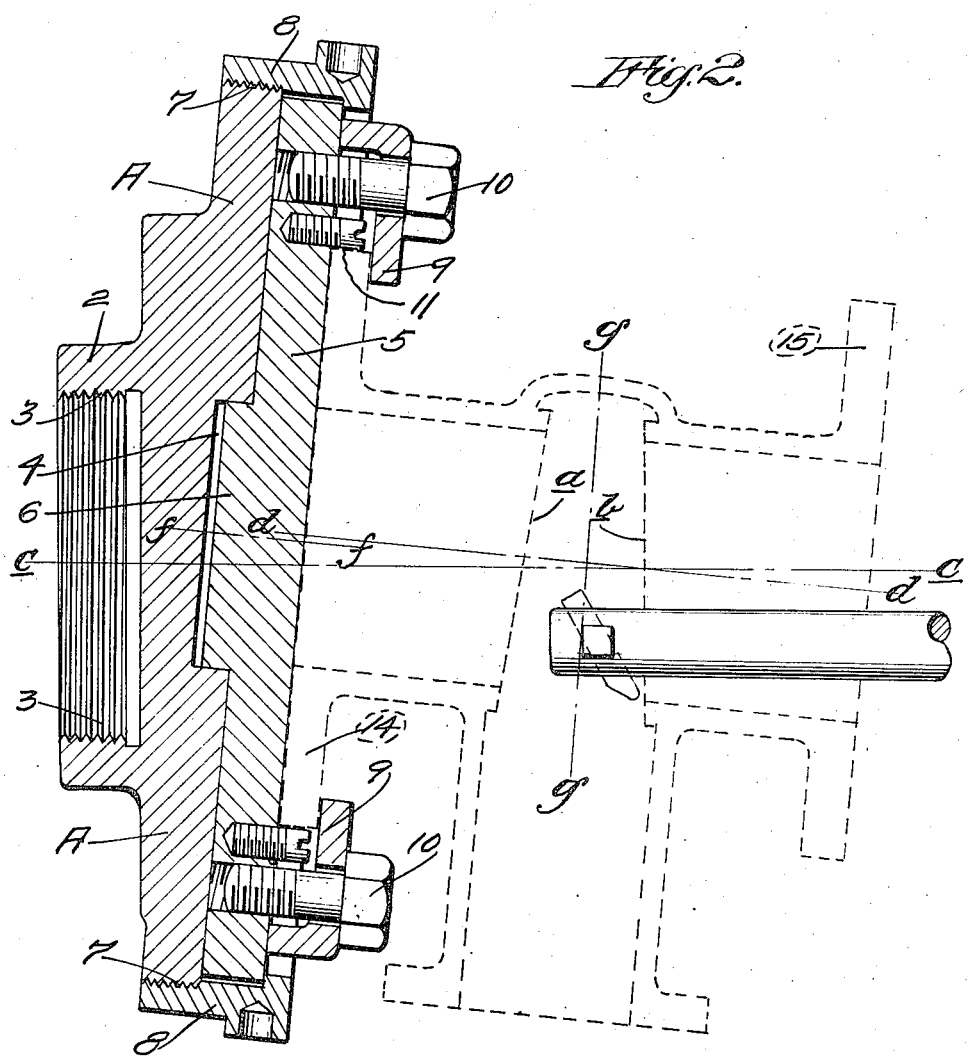
Fig. 2 is a view similar to Fig. 1, but showing the position of the turntable and valve housing when rotated 180 degrees with relation to the position shown in Fig. 1.

Referring to the drawings in detail and especially Figs. 1 and 2, A indicates in general a head member on the rear face of which is formed a hub 2, said hub being interiorly threaded as indicated at 3, to permit the head to be secured to and driven by the spindle of a machine lathe. The forward face of the head is disposed on an angle of 5 degrees with relation to a vertical line or a line disposed at right angles to the longitudinal axis of the hub 2 or the lathe spindle to which the head is attached. A circular recess is formed in the forward face as indicated at 4, which forms a center 6 for a turntable 5; also disposed on an angle of 5 degrees. The peripheral edge of the head is threaded as at 7, to receive a clamping ring 8 which engages the peripheral edge of the turntable 5 to normally secure it against rotation as will hereinafter be described.

The work to be machined, for instance a gate valve housing indicated at 3, is secured to the turntable by clamps 9 and bolts 10, and in addition thereto, is positioned before being secured by the clamps, by means of guide or locating pins 11. The only portions of the gate valve housing to be machined when clamped to the turntable are the two angularly positioned opposed inter-spaced valve seats indicated at $a$ and $b$. Only one seat can be machined at the time, and that seat must be vertically disposed with relation to the longitudinal axis of the lathe spindle or the dash and dot line indicated at C—C. One of the main features of the present invention is to provide a fixture of the type disclosed, which will reduce the time-consuming job of setting up the valve or work to be machined to an absolute minimum and furthermore, permit machining of both the valve seats $a$ and $b$ in one setting.

To accomplish this, let it be understood that the flanges 14 and 15 of the valve housing are machined in a lathe in the usual manner, with care being taken that the faces of the flanges when finished are disposed at right angles to the longitudinal axis of the valve indicated by the dash and dot line $d$—$d$, and that the peripheral edges $e$—$e$ are concentric to said longitudinal axis. With a valve housing thus machined, one flange is placed against the face of the turntable between and in engagement with locating pins 11, and is then secured by the clamps and bolts 9 and 10. The center of rotation of the turntable is indicated by the dash and dot line $f$—$f$, but the locating pins, while arranged in a circle to engage the peripheral edge of the valve housing flange, are slightly eccentric to the center $f$—$f$, the eccentricity being shown by the center line of the valve housing or the dash and dot line $d$—$d$. The exact amount of eccentricity is determined by having the center line $c$—$c$ and $d$—$d$ cross each other at the center point 16 of the valve seat face $a$ to be machined, and then drawing a third center line $g$—$g$ through the valve housing midway between the valve seats $a$ and $b$ and at right angles to the center line $d$—$d$. The last center line $g$—$g$ crosses the center lines $c$—$c$ and $d$—$d$. At the point where the center line $g$—$g$ crosses them, the eccentricity of the locating pins 11, with relation to the center of rotation of the turntable is measured and determined. Now let it be assumed that for a given size valve for instance, a 4 inch valve that the distance is ⅛ of an inch, then obviously when the flange of the valve housing is placed against the face of the turntable and positioned by the pins 11 and firmly secured, the longitudinal axis or the center line $d$—$d$ of the valve housing will be parallel to the axis of rotation of the turntable, but will be spaced above that center a distance of ⅛ of an inch, and valve seat $a$ will be positioned vertical to the axis of the spindle and concentric to said axis. Hence by inserting a boring bar and a cutting tool as indicated at 18, valve seat $a$ may be rapidly and accurately machined.

It should here be noted that the setting up operation requires a minimum of time and no skill whatsoever as all the lathe hand or operator had to do was to place the flange of the valve housing against the face of the turntable and then secure it by the bolts and clamps 9 and 10. The location pins positioned the valve housing during this operation and determines the accuracy of the setting up operation. Hence the operator cannot make any mistake and is in no way depended upon except to see that the clamps are properly tightened and then to watch and control the work of the cutting tool.

After the valve face $a$ has been machined or turned, the bar and cutting tool is retracted, the clamping ring 8 is loosened and two spring actuated pins carried by the head and indicated at 20, are pulled out of engagement with the turntable. The turntable thus freed is now partially rotated and pins 20 are released, the turntable is again rotated until holes formed therein for the reception of the pins move in to register with the pins when they snap in and secure the table against further rotation. The clamping ring 8 is again tightened to grasp and secure the turntable, the boring bar is re-inserted with the tool 18 clamped to engage the valve seat face $b$ as shown in Fig. 2, and when this is machined the work in the valve housing is completed and it is removed by releasing the bolts and clamps 9 and 10.

The degree of rotation of the table when changing from the position shown in Fig. 1 to that shown in Fig. 2 is exactly 180 degrees, and as the longitudinal axis $d$—$d$ of the valve is eccentric to the axis of rotation of the turntable the point of crossing of the lines $c$—$c$ and $d$—$d$ will shift from the face of the valve seat $a$ to the face of the valve seat $b$ as shown in Fig. 2, and the face $b$ will be perpendicular to the line $c$—$c$ so as to be in position to be machined. Also, it should be noted that the machining of second face $b$ required no setting up operation as change from one valve seat face to the other is accomplished by merely rotating the turntable 180 degrees.

The reason for mounting the turntable on an angle of 5 degrees is due to the fact that the valve seats $a$ and $b$ of the valve housing B are disposed on an angle of 5°, this being standard but the angle may be more or less.

The fixture is not limited to one size of valve. As holes to receive positioning pins may be drilled substantially concentric to the positioning pins 11 both exterior and interior thereof, to receive valve flanges of varying diameter, care must however be taken when drilling these holes as the eccentricity of each set of holes decreases as the valve size decreases. Hence while each set of holes are substantially concentric with relation to each other they are not exactly so due to the decrease in eccentricity and while these and other features of the invention are more or less specifically illustrated, I wish it understood that various changes in form and proportion may be resorted to within the scope of the appended claims; similarly that the materials and finish of the several parts employed may be such as the experience and judgment of the manufacturer may dictate or varying uses may demand.

Having thus described and illustrated our invention, what we claim and wish to secure by Letters Patent is:

1. A fixture of the character described, comprising a head member adapted to be secured to and driven by the spindle of a lathe, a turntable mounted on the head and disposed on an angle with relation to the longitudinal axis of the lathe spindle, pins extending from the face of the table to receive and maintain a valve housing in a position eccentric to the axis of rotation of the table, means for securing the valve housing to the table when positioned by the pins, said table being rotatable with relation to the head, from one fixed position to a second fixed position a distance of 180 degrees, and means for securing the table against rotation with relation to the head in either position, said valve housing having two spaced apart angularly disposed valve seats formed therein and said seats being disposed on the same angle as the table, one of said valve seats assuming a vertical position at right angles to the longitudinal axis of the head and lathe spindle in the first fixed position of the table, and the other valve seat, a vertical position in the second fixed position of the table to permit both valve seats to be separately machined.

2. A fixture of the character described, comprising a head member adapted to be secured to and driven by the spindle of a lathe, a turntable mounted on the head and disposed on an angle with relation to the longitudinal axis of the lathe spindle, pins extending from the face of the table to receive and maintain a valve housing in a position eccentric to the axis of rotation of the table, means for securing the valve housing to the table when positioned by the pins, said table being rotatable with relation to the head, from one fixed position to a second fixed position a distance of 180 degrees, said valve housing having two spaced apart angularly disposed valve seats formed therein and said seats being disposed on the same angle as the table, one of said valve seats assuming a vertical position at right angles to the longitudinal axis of the head and lathe spindle in the first fixed position of the table and the other valve seat a vertical position in the second fixed position of the table to permit both valve seats to be separately machined, a clamping ring having a threaded connection with the exterior edge of the head member, and an annular flange on said clamping ring engageable with the outer edge of said turntable to secure the turntable against rotation with relation to the head member.

HAROLD G. HENDRICKSON.
    VERNER J. HAGBERG.

REFERENCES CITED

The following references are of record in the file of this patent:

UNITED STATES PATENTS

| Number | Name | Date |
|---|---|---|
| 1,745,525 | Bissell | Feb. 4, 1930 |
| 1,937,240 | Odum | Nov. 28, 1933 |
| 1,979,897 | Melcher | Nov. 6, 1934 |
| 1,666,292 | Knudsen | Apr. 17, 1928 |